United States Patent
Robillard et al.

(10) Patent No.: US 10,241,906 B1
(45) Date of Patent: Mar. 26, 2019

(54) MEMORY SUBSYSTEM TO AUGMENT PHYSICAL MEMORY OF A COMPUTING SYSTEM

(71) Applicant: EMC Corporation, Hopkinton, MA (US)

(72) Inventors: Michael Robillard, Shrewsbury, MA (US); Dragan Savic, Brookline, MA (US); Adrian Michaud, Carlisle, MA (US); Robert Beauchamp, Berlin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 110 days.

(21) Appl. No.: 15/224,534

(22) Filed: Jul. 30, 2016

(51) Int. Cl.
*G06F 12/02* (2006.01)
*G06F 12/0804* (2016.01)
*G06F 12/0873* (2016.01)

(52) U.S. Cl.
CPC ........ *G06F 12/023* (2013.01); *G06F 12/0292* (2013.01); *G06F 12/0804* (2013.01); *G06F 12/0873* (2013.01); *G06F 2212/1016* (2013.01); *G06F 2212/305* (2013.01); *G06F 2212/3042* (2013.01)

(58) Field of Classification Search
None
See application file for complete search history.

(56) References Cited

U.S. PATENT DOCUMENTS

| | | | | |
|---|---|---|---|---|
| 5,918,229 A * | 6/1999 | Davis | ........... | G06F 9/5016 705/27.1 |
| 8,612,809 B2 * | 12/2013 | Casper | ........... | G11C 5/02 714/708 |
| 2004/0052046 A1 * | 3/2004 | Regimbal | ........... | G06F 1/184 361/679.33 |
| 2009/0055596 A1 * | 2/2009 | Wallach | ........... | G06F 9/3879 711/141 |
| 2009/0240911 A1 * | 9/2009 | Yamada | ........... | G06F 3/0605 711/171 |
| 2010/0322582 A1 * | 12/2010 | Cooke | ........... | G02B 6/4452 385/135 |
| 2013/0297907 A1 * | 11/2013 | Ki | ........... | G06F 12/0684 711/170 |
| 2014/0040532 A1 * | 2/2014 | Watanabe | ........... | G06F 13/1668 711/103 |
| 2014/0115281 A1 * | 4/2014 | Coteus | ........... | G06F 1/20 711/154 |

(Continued)

*Primary Examiner* — Tracy C. Chan
(74) *Attorney, Agent, or Firm* — Ryan, Mason & Lewis, LLP

(57) ABSTRACT

Systems and methods are provided for implementing a memory subsystem to augment physical memory of a computing system. For example, a system comprises a memory subsystem, and a computing system coupled to the memory subsystem. The computing system comprises a processor, a first memory module, and a second memory module. The first memory module comprises random access memory which is utilized by the processor to store data associated with an application executing on the computing system. The second memory module comprises control logic circuitry that is configured to control access to the memory subsystem on behalf of the processor to store and retrieve data associated with the application executing on the computing system.

20 Claims, 4 Drawing Sheets

(56) References Cited

U.S. PATENT DOCUMENTS

| | | | |
|---|---|---|---|
| 2014/0281265 A1* | 9/2014 | Atkisson | G06F 12/0802 |
| | | | 711/136 |
| 2015/0181317 A1* | 6/2015 | Yin | H04Q 11/0062 |
| | | | 398/45 |
| 2017/0139849 A1* | 5/2017 | Bandic | G06F 13/4282 |

* cited by examiner

MEMORY SUBSYSTEM TO AUGMENT PHYSICAL MEMORY OF A COMPUTING SYSTEM

FIELD

The field relates generally to data storage and, more particularly, to techniques for implementing physical memory systems.

BACKGROUND

Various types of applications execute on servers of cloud computing systems to provide different network functionalities and services. These applications are unique in various ways with regard to the types and amount of computing resources (e.g., processor cycles, memory, network bandwidth, etc.) that are needed to support the execution of such applications. For example, different applications have different memory requirements. Since it is prohibitively expensive to provision a computing system with the maximum amount of physical memory that may be needed by any particular application, a computing system can utilize virtual memory though a virtual memory management system. As is known in the art, virtual memory is an operating system feature that compensates for a shortage of physical memory (e.g., RAM (random access memory)) by temporarily transferring pages of data from the physical memory to a secondary storage such as disk storage (e.g., HDD (hard disk drive) storage).

In particular, in a virtual memory system, program code of a given application is written to expect a large, virtual memory range. The operating system of the host server manages a large virtual address space, as well as a much smaller range of expensive, physical memory. The operating system assigns physical memory to virtual memory. In the event that a requested page of memory is not present in the physical memory, the operating system will fetch that page from a large, inexpensive, backing store. Traditionally, this backing store has been based on HDD storage. However, conventional storage stacks that rely on a HDD backing store, for example, provide low-latency backing storage support, which can unduly throttle modern application performance. Indeed, high-performance applications such as in-memory databases require access to large amounts of physical memory to avoid the latencies associated with accessing data via a traditional storage stack.

SUMMARY

Embodiments of the invention include systems and methods for implementing a memory subsystem to augment physical memory of a computing system. In one embodiment, a system comprises a memory subsystem, and a computing system coupled to the memory subsystem. The computing system comprises a processor, a first memory module, and a second memory module. The first memory module comprises random access memory which is utilized by the processor to store data associated with an application executing on the computing system. The second memory module comprises control logic circuitry that is configured to control access to the memory subsystem on behalf of the processor to store data associated with the application executing on the computing system.

Other embodiments will be described in the following detailed description, which is to be read in conjunction with the accompanying drawings.

DETAILED DESCRIPTION

Illustrative embodiments will now be described in further detail with regard to systems and methods for implementing a memory subsystem that is configured to augment physical memory of a computing system. As explained in further detail below, embodiments of the invention include optimized memory subsystems that can be implemented at "rack-scale" to provide a low-latency backing store to augment physical memory that locally resides on a computing system, such as a server.

Figure 1:
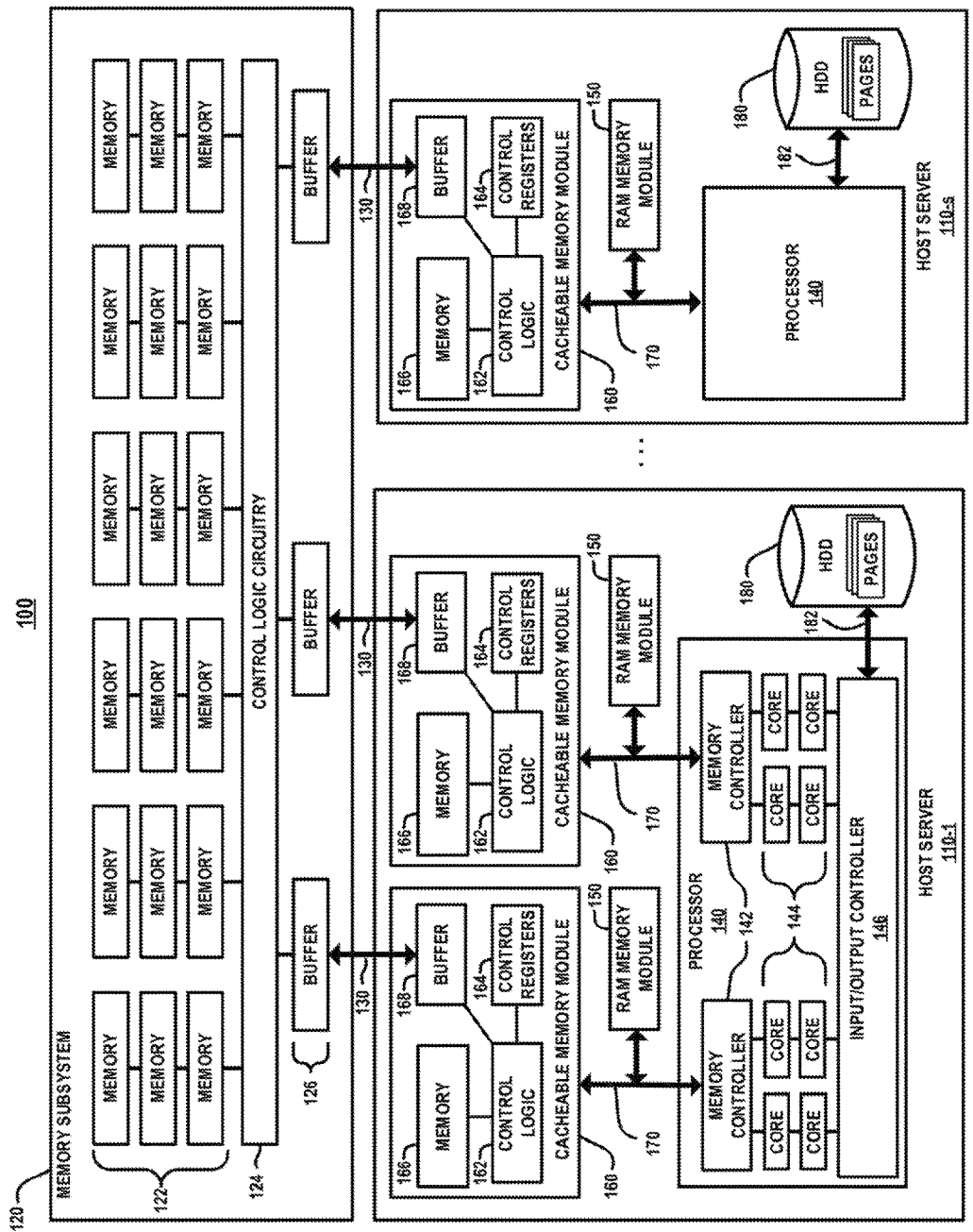
FIG. 1 is a high-level schematic illustration of a computing system which implements a memory subsystem to augment physical memory of the computing system, according to an embodiment of the invention.

For example, FIG. 1 is a high-level schematic illustration of a computing system which implements a high-performance memory subsystem to augment physical memory of the computing system, according to an embodiment of the invention. In particular, FIG. 1 schematically illustrates a computing system 100 comprising a plurality of server nodes 110-1, . . . 110-s (collectively referred to herein as server nodes 110, or singularly referred to herein as server node 110), and a memory subsystem 120 coupled to the server nodes 110 via high-speed serial links 130. The memory subsystem 120 comprises a plurality of memory devices 122, control logic circuitry 124, and a plurality of buffers 126 to support, e.g., parallel-to-serial conversion and other functions for high-speed serial communications over the high-speed serial links 130 between the server nodes 110 and the memory subsystem 120.

In the example embodiment of FIG. 1, the server nodes 110 each comprise a processor 140, a first memory module 150 (alternatively referred to herein as a RAM memory module), a second memory module 160 (alternatively referred to herein as a cacheable memory module 160), a memory interface 170, and a persistent storage device (e.g., HDD device) 180. In one embodiment, the first memory module 150 comprises random access memory (e.g., dynamic random-access memory (DRAM) or synchronous DRAM (SDRAM), etc.), or other types of memory, in any combination, which is utilized by the processor 140 to store data associated with an application executing on the server node 110. The terms "memory" or "system memory" "local memory", etc., as used herein refers to volatile and/or non-volatile memory which is utilized to store application program instructions that are being used by the processors 140 to execute a host operating system and running instances of applications on the servers 110, as well as to temporarily store data (e.g., cached data blocks, pages, etc.) that is utilized and/or generated by the host operating systems and the running application instances.

In addition, the second memory module 160 is configured to control access to the memory subsystem 120 on behalf of the processor 140 to store data associated with an application executing on the server node 110. In this regard, the second memory module 160 implements functionality that enables the server node 110 to utilize the memory subsystem 120 to augment local physical memory, e.g., the RAM memory module 150 for various operating modes, as discussed below.

In the example embodiment of FIG. 1, the processor 140 of the server node 110-1 is shown as comprising a plurality of memory controllers 142 (which may implement a MMU (memory management unit)), a plurality of processing cores 144, and an input/output controller 146. The processors 140 of the other server nodes of the computing system 100 may have the same architecture or a different architecture than the processor 140 of the server node 110-1, as shown in FIG. 1. In this regard, it is to be understood that processors 140 of the server nodes 110 may be, for example, one or more of a computer processor, a microprocessor, a microcontroller, an application-specific integrated circuit (ASIC), a field programmable gate array (FPGA), and other types of processors, as well as portions or combinations of such processors.

In particular, the term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

The persistent storage device 180 comprises any type of non-volatile storage media including, but not limited to, disk storage devices (e.g., HDDs), flash storage devices (e.g., PCIe flash cards), SSD (solid state drive) devices, or other types and combinations of non-volatile memory and associated drive types such as external DAS (direct attached storage) devices that can be coupled to the server nodes 110 using a suitable interface 182 (e.g., SCSI, SATA or SAS interfaces). The processor 140 will access data, e.g., pages, in the HDD 180 through operation of the input/output controller 146, using known methods.

As further shown in FIG. 1, each cacheable memory module 160 comprises control logic 162, control registers 164, memory 166, and a buffer 168. The control logic 162 is configured to control data access operations between the processor 140 and the memory subsystem 120 using methods discussed herein. The control registers 164 are configured to store control data and other types of data structures that are used by the control logic 162 to communicate with the memory subsystem 120, access data from the memory subsystem 120, perform address mapping/translation operations for mapping/translating physical addresses in the local memory (e.g., memory 150, 166) to/between physical addresses in the memory subsystem 120.

Furthermore, the memory 166 of the cacheable memory module 160 may comprise volatile memory (e.g., DRAM, etc.) which can be used as local memory to augment the local memory of the RAM memory module 150 for purposes of caching, paging, virtual memory support, etc. The memory 166 may also include non-volatile memory. The buffers 168 of the cacheable memory modules 160 are configured to implement functions such as parallel-to-serial conversion and other functions to support high-speed serial communications over the high-speed serial links 130 between the server nodes 110 and the memory subsystem 120.

In the embodiment of FIG. 1, each cacheable memory module 160 is connected to the memory subsystem 120 via an independent high-speed serial link (HSSL) 130 using a high-speed HSSL interface protocol. In another embodiment, each server node 110 is also connected to the memory subsystem 120 by a management network (e.g. an Ethernet network) to facilitate coordination between the server nodes 110 and the memory subsystem 120. This management network provides an out-of-band communications network that minimizes the complexity of the HSSL interface, and allows the HSSL interface to be used primarily for data access operations.

Further, in one embodiment, the memory modules 150 and 160 are coupled to the memory controller 142 of the processor 140 via a memory interface 170. In one embodiment, the memory interface 170 is implemented as a high speed synchronous communication interface (e.g., a DDR4 (double data rate fourth-generation) SDRAM interface). Preferably, the HSSL interface 130 is implemented with a communications protocol that is significantly faster (e.g. 4-8 times faster) than the memory interface 170.

In one embodiment, the HSSL interface is configured to transfer data pages between the memory subsystem 120 and the cacheable memory module 160 over the high-speed serial link 130 for various purposes. For example, page transfers can be triggered by page faults in the local memory (e.g., memory 166, RAM memory module 150, etc.), in which case requested pages can be accessed from the memory subsystem 120. In addition, page transfers can be triggered by page discards (e.g., write pages to the memory subsystem 120), by rule (e.g., write cache line to memory subsystem 120), by command, or automatically upon power failure of a server node 110, etc.

In typical memory interfaces such as DDR SDRAM, the timing on the memory interface 170 between a DRAM on the memory module 150 and the processor 140 is very strict. Indeed, memory interfaces such as DDR4 have a strict master-slave relationship, wherein dual-ported access to these memories is difficult. This strict timing makes protecting writes, at memory speed, difficult. Embodiments of the invention which implement the cacheable memory module 160 and memory subsystem 120 mitigate such timing issues while implementing a low-latency backend data store via the memory subsystem 120 to augment the local memory (e.g., memory 166, RAM memory module 150, etc.).

For example, if data pages requested by an application executing on a given server node 110 are not found in the local memory of the memory modules 150 or 160, resulting in a page fault, the operating system of the server node 110 can generate a processor exception in response to the page fault. This exception triggers the processor 140 to perform certain functions in conjunction with the cacheable memory module 160 to assist with clearing the page fault. In particular, if a page fault occurs, data is transferred over the HSSL interface from the memory subsystem 120 into the buffer 168 of the cacheable memory module 160. The processor 140 then proceeds to transfer the data from the buffer 168 to either local memory 166 of the cacheable memory module 160, or to local memory (e.g., DRAM) located on the RAM memory module 150.

The control logic 162 of the cacheable memory module 160 is configured to optimize such data transfer wherein, for example, buffer reads and DRAM writes can occur simultaneously. In addition, page eviction operations are handled in a similar manner unless the cacheable memory module 160 is configured for write-through operations.

The memory modules 150 and 160 can be implemented in various ways. For example, in one embodiment of the invention, one or more of the memory modules 150 and 160 can be implemented as dual in-line memory (DIMM) modules that are capable of plugging into standard, unmodified, server DIMM slots. In this implementation, the HSSL interface could be implemented as a copper or optical interface from each DIMM to the memory subsystem 120. In another embodiment, one or more of the memory modules 150 and 160 can be implemented as chipsets that are mounted to a motherboard with the processors 140. In other embodiment, one or more of the memory modules 150 and 160 can be separate chips that are packaged with processors 140 in a stacked three-dimensional configuration, using known packaging techniques.

In one embodiment, the control logic 162 of the cacheable memory module 160 is configured to generate interrupts to the processor 140 upon certain events. For example, the control logic 162 can be configured to generate an interrupt to the processor 140 to indicate when commands are complete (e.g. previously faulted pages are available). In addition, the control logic 162 of the cacheable memory module 160 may be configured to detect power fail events, wherein a tethered power supply could be leveraged to facilitate transferring dirty memory pages to the memory subsystem 120 in the event that the server node 110 loses power.

In the memory subsystem 120, the memory devices 122 may be implemented using one or more types of volatile and/or non-volatile memories. For example, some or all of the memory devices 122 can be RAM devices and/or flash memory devices, and/or SSD devices, etc. The control logic circuitry 124 is configured to control access to memory devices 122 of the memory subsystem 120 based on data access commands received from the cacheable memory modules 160 of the server nodes 110. In one embodiment, the control logic circuitry 124 of the memory subsystem 120 is configured to support data encryption at some level of granularity. The control logic circuitry 124 can be configured to implement a wide range of different functionalities with regard to data storage services.

For example, data stored in the local memory 166 of a cacheable memory module 160 can be interpreted and acted upon by the memory subsystem 120. In particular, if page tables are stored in the control registers 164 of the cacheable memory module 160, the page tables can be monitored by the memory subsystem 120. If a dirty bit is used, any page table entry that is marked dirty could force the corresponding page in the memory subsystem 120 to be discarded. For media types that are asymmetric in nature (i.e. writes take longer than reads), overall performance could be improved in this regard.

Furthermore, the memory subsystem 120 can be leveraged to quickly transfer data between coherent processing domains. Traditionally, transferring data between processing domains involves either explicitly transferring the data across a non-coherent bus using a DMA engine or leveraging a cache coherent subsystem to 'transfer' the data in place. The memory subsystem 120 can be configured to transfer ownership between non-coherent (and potentially heterogeneous) system elements via either an in-band or an out-of-band (e.g. Ethernet) interface.

Moreover, in one embodiment, the memory subsystem 120 is configured as a page-based memory-backing store that supports load-store semantics as well as data services. For example, 4K pages could be stored using erasure coding to provide enhanced reliability and error detection/correction with an optimal replication factor.

While FIG. 1 shows one example embodiment of a computing system 100 with multiple server nodes 110, it is to be understood that the term "computing system" as used herein is intended to be broadly construed so as to encompass, for example, any system comprising multiple networked processing devices such as a datacenter, cloud computing system, or enterprise network, etc. Moreover, components of systems as disclosed herein can be implemented at least in part in the form of one or more software programs stored in memory and executed by a processor of a server or other computing device. Memory (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, it is to be appreciated that the server nodes 110 shown in FIG. 1 may comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the computing system 100 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

The memory subsystem 120 can be operated in various modes of operation according to embodiments of the invention. For example, in a first mode of operation, the memory subsystem 120 can be operated as a fast virtual memory backing store. In particular, in this mode of operation, the memory subsystem 120 operates as a low-latency backing store for the virtual memory systems of the operating systems of the server nodes 110. In this mode of operation, an operating system of a server node 110 maintains a set of page directories and page tables to provide user processes (e.g., applications running on the server node 110) with a virtual address space that is larger than the amount of physical memory. After an initial memory load of data pages from, e.g., the HDD 180 or the memory subsystem 120, memory pages (e.g., 4K pages) are evicted to the memory subsystem 120 and page faults are sourced from the memory subsystem 120 at very high speed. This gives the applications running on the server node 110 the appearance of a contiguous very large memory space. In this mode of operation, the memory subsystem 120 is not persistent, and dirty pages are flushed to the memory subsystem 120 at page boundaries according to the page eviction policy implemented by the operating system. A method for utilizing the memory subsystem 120 as a high-speed virtual memory backing store according to an embodiment of the invention will be discussed in further detail below with reference to FIG. 4.

In another embodiment, the memory subsystem 120 is implemented or otherwise configured as a high-speed block device. In particular, in this mode of operation, the memory subsystem 120 provides block level semantics to applications running on the server nodes 110, wherein data blocks are cached in the RAM memory module 150 or in the memory 166 of the cacheable memory module 160. In block device mode, when data is written into the local caches of the memory modules 150 and 160, the data writes are immediately pushed to the memory subsystem 120 at cache line boundaries. In this mode of operation, the memory subsystem 120 is persistent. In one embodiment, the "block address" comprises the upper bits of one segment of the virtual memory address space of the application/process. In effect, in this mode of operation, a block of data is written into a local cache memory (e.g., memory module 150 or 160) and a corresponding location in the memory subsystem 120 at the same time using a "write-through" operation.

In yet another mode of operation, the memory subsystem 120 is implemented or otherwise configured as an advanced, shared memory system. In this mode of operation, the memory subsystem 120 is configured to support a set of remote operations to facilitate advanced software development. These features may include, for example, "test-and-set," which is an instruction used to write to a memory location and return its old value as a single atomic (i.e., non-interruptible) operation. A custom API (application programming interface) would be utilized to provide these features. From an advanced shared memory perspective, certain primitives would be utilized to unlock certain functions of the memory subsystem 120. In one embodiment, the cacheable memory module 160 would support such functions by utilizing the control registers 164 to store the configuration data needed to support such advanced memory functions, and utilizing the control logic 162 to execute such advanced memory functions using the configuration data in the control registers 164.

Figure 2:
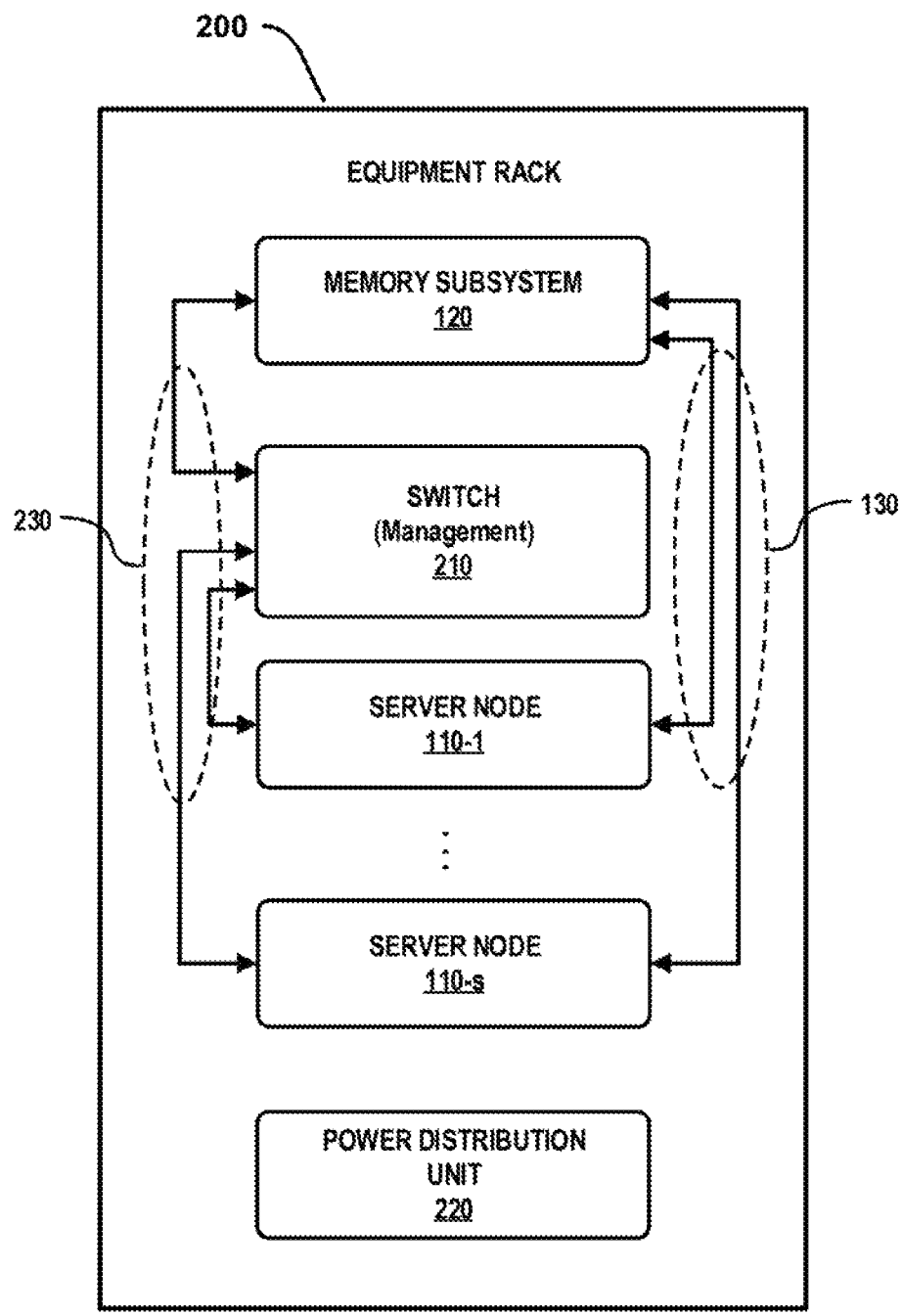
FIG. 2 schematically illustrates a rack-scale implementation of the computing system of FIG. 1, wherein the memory subsystem comprises a rack-mounted memory unit that is mounted in an equipment rack, according to an embodiment of the invention.

The computing system 100 of FIG. 1 can be physically implemented and arranged using known techniques. For example, in one embodiment of the invention, various system components of the computing system 100 can be implemented as rack-mounted modules that are arranged in a computing rack. For example, FIG. 2 schematically illustrates a rack-scale implementation of the computing system 100 of FIG. 1, wherein the memory subsystem 120 and sever nodes 110 comprise rack-mounted units that are mounted in an equipment rack 200, according to an embodiment of the invention. The equipment rack 200 schematically shown in FIG. 2 comprises a rack installation framework which includes multiple mounting slots (referred to as, e.g., bays), wherein each mounting slot is designed to hold a given hardware unit secured in place with screws.

As shown in the example embodiment of FIG. 2, the memory subsystem 120 and server nodes 110 are rack-mounted modules that are arranged in stacked configuration with other rack-mounted modules including, but not limited to, a switching module 210, a PDU (power distribution unit) module 220, and other types of computing hardware/equipment that is typically included in equipment racks within a datacenter facility, for example. In one embodiment the switching module 210 is configured to provide an out-of-band management network to facilitate coordination between the server nodes 110 and the memory subsystem 120 and thereby minimize the complexity of the high-speed serial interface communication protocol that is used for data I/O operations between the server nodes 110 and the memory subsystem 120. The PDU module 220 is configured to control power supply levels and power distribution to the various rack-mounted modules within the given equipment rack 200.

The rack 200 further comprises cabling to implement the independent high-speed serial links 130 between the memory subsystem 120 and the server nodes 110, as well as cabling 230 to support communication links between switching module 210 and the memory subsystem 120 and server nodes 110. In one embodiment, the cabling for the high-speed serial links 130 may be implemented using copper wiring or optical fiber wiring. Further, in one embodiment of the invention, the cabling 230 comprises Ethernet cables to support an Ethernet-based out-of-band communications network between the memory subsystem 120 and the server nodes 110.

Figure 3:
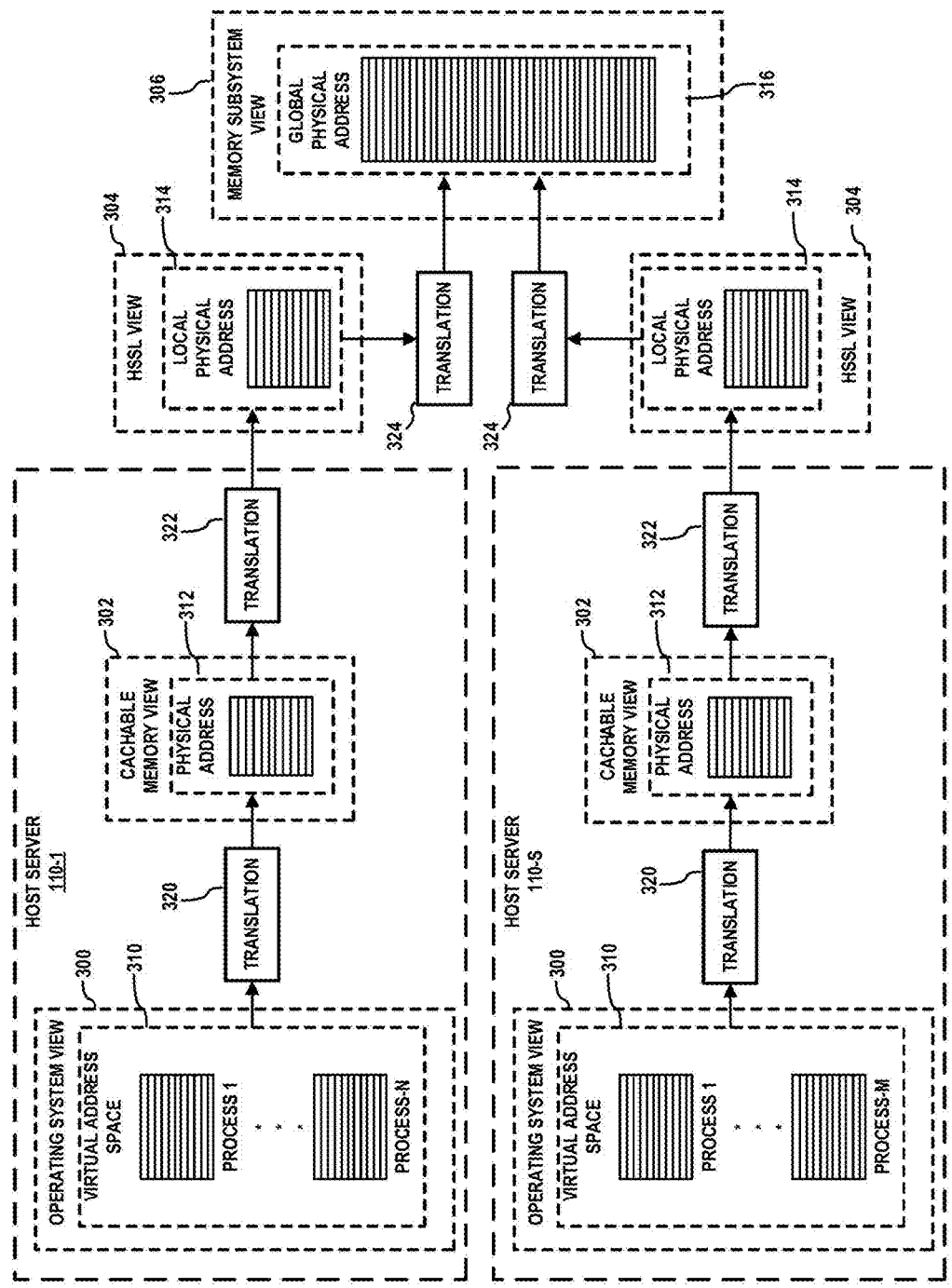
FIG. 3 schematically illustrates an addressing protocol for translating between virtual addresses and physical addresses in the computing system of FIG. 1, according to an embodiment of the invention.

The computing system 100 of FIG. 1 is configured to implement different address schemes to translate between the different levels of memory. In particular, FIG. 3 schematically illustrates an addressing protocol for translating between virtual addresses and physical addresses in the computing system of FIG. 1 to augment physical memory with the memory subsystem, according to an embodiment of the invention. As shown in FIG. 3, there are generally four different addressing schemes or "views" of memory including an operating system view 300, a cacheable memory view 302, a HSSL view 304, and a memory subsystem view 306.

In each server node 110-1, . . . , 110-s, the operating system view 300 maintains a virtual address space 310 for each of the processes/applications executing on the given server node 110. In each server node 110, the associated operating system can support single or multiple virtual address spaces. The sum of all virtual address spaces 310 under management by the operating system is referred to as the operating system view 300. Moreover, in each server node 110, the cacheable memory view 302 maintains a physical address space 312 for an associated processor 140. In particular, each processor 140 comprises a physical address space 312 that the processor 140 uses to address memory in the RAM memory module 150 and/or the cacheable memory module 160.

Further, each HSSL view 304 is utilized by an associated cacheable memory module 160 to manage a local physical address space 314. The HSSL view 304 of a given cacheable memory module 160 provides a unique local physical address for every page sent to the memory subsystem 120, wherein the unique local physical addresses of memory pages that are stored/accessed in the memory subsystem 120 by a given server node are logically associated with the given server node.

In this manner, in a shared memory implementation where the memory subsystem 120 is shared by multiple server nodes, the HSSL view 304 provides a unique address for every memory page sent to the memory system 120 by a given server node.

Moreover, the memory subsystem view 306 is utilized by the memory subsystem 120 to manage a global physical address space 316. In a shared memory implementation where the memory subsystem 120 is shared by multiple server nodes, the memory subsystem 306 must track different memory pages from different server nodes. In one embodiment of the invention, while memory pages from a given server node are numbered individually for the given server node, a prefix is appended to the memory pages of the given server node so that such memory pages are globally unique in the global physical address space 316 of the memory subsystem 120. In other words, the global physical address space 316 of the memory subsystem view 306 comprises indexing information that enables memory pages from multiple server nodes to be appropriately identified on a per server basis.

As further shown in FIG. 3, various translation modules 320, 322 and 324 are utilized to translate between virtual and physical addresses, and to translate between physical addresses of the different memory modules. In particular, the translation module 320 in each sever node 110 is utilized by the operating system of the server node 110 to convert a virtual addresses of the virtual address space 310 into physical addresses of the physical address space 312 of a processor 140. The translation modules 320 include control circuitry and data structures such as page directories and tables to translate between virtual and physical addresses using well know techniques.

In addition, the translation module 322 of each server node 110 implements a reverse lookup/translation mechanism to translate between physical addresses of the physical address space 312 and local physical addresses of the local physical address space 314. In one embodiment, translation modules 322 are implemented by the control logic 162 of the cacheable memory modules 160 using data structures such as page directories and tables that are maintained in the control registers 164 of the cacheable memory modules 160. The translation modules 324 implement a reverse lookup/translation mechanism to translate between local physical addresses of the local physical address space 314 and global physical addresses of the global physical address space 316 of the memory subsystem view 306. In one embodiment, translation modules 324 are implemented by the control logic circuitry 124 of the memory subsystem 120.

In operation, the translation modules 322 are utilized by the cacheable memory modules 160 to convert physical addresses into local physical addresses for transmission over the high-speed serial links 130 to the memory subsystem 120. The translation modules 324 are utilized by the memory subsystem 120 to translate between local physical addresses and global physical addresses to enable memory pages from the different server nodes 110 to be properly stored to, and accessed from, the memory subsystem 120, when such memory subsystem 120 shared by the different server nodes 110.

Figure 4:
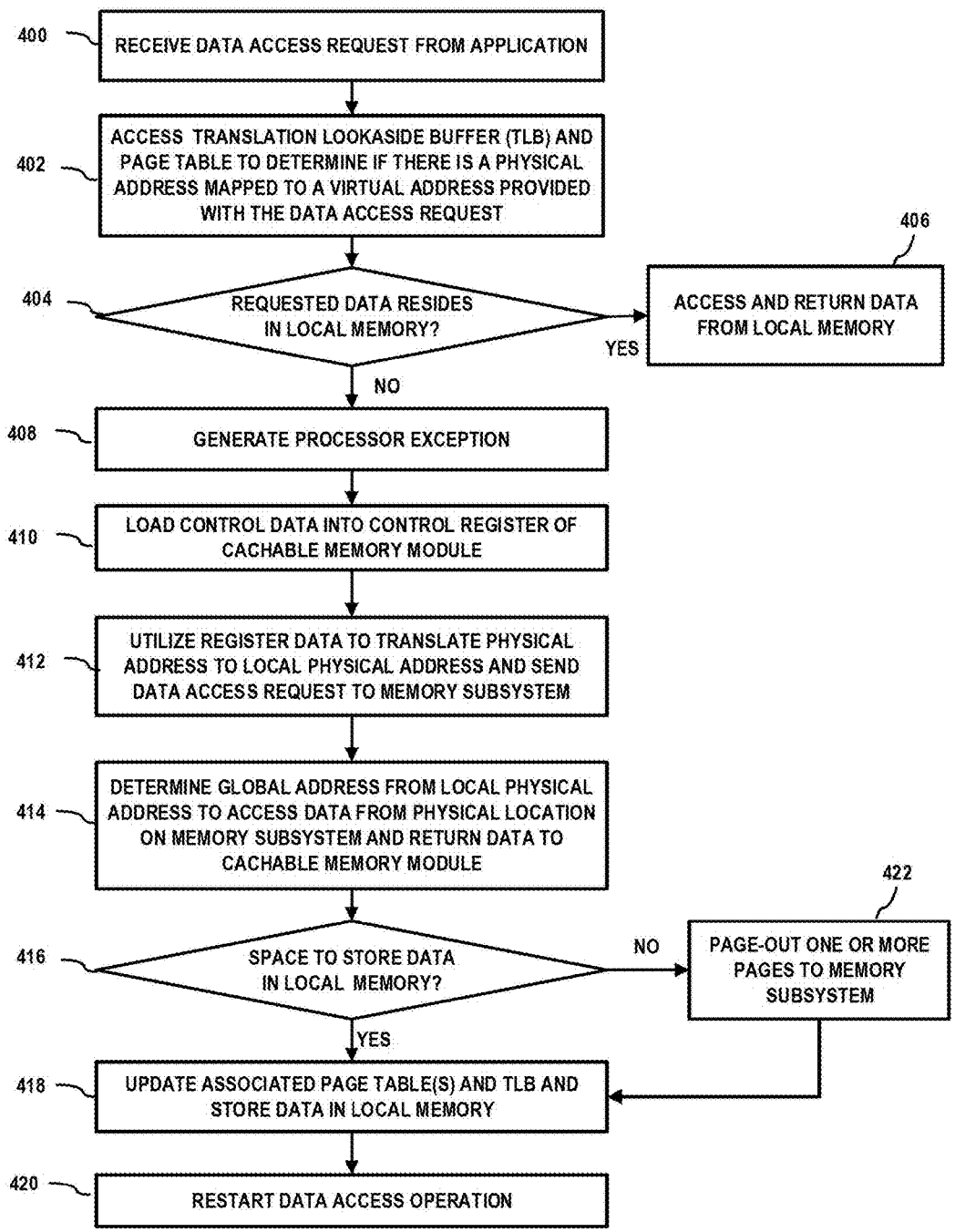
FIG. 4 is a flow diagram of a method for utilizing a memory subsystem as a high-speed virtual memory backing store, according to an embodiment of the invention.

FIG. 4 is a flow diagram of a method for utilizing the memory subsystem 120 of FIG. 1 as a high-speed virtual memory backing store, according to an embodiment of the invention. For illustrative purposes, the method of FIG. 4 will be described with reference to the addressing scheme depicted in FIG. 3. In accordance with an embodiment of the invention, each operating system of a server node 110 implements a virtual memory system that manages virtual memory spaces of applications/processes executing on the server node 110. With virtual memory, the main memory as seen by an application/process appears as a large, contiguous address space or section of memory, but on a physical level, the memory pages of each application/process are located in different regions of physical memory (e.g., the RAM memory module 150, memory 166 of the cacheable memory module 160, etc.), or such memory pages may have been stored to (paged out) to a secondary storage system such as the memory subsystem 120. The operating system manages virtual address spaces and the assignment of real memory to virtual memory.

When an application requires access to data (e.g., pages, blocks, etc.) in its virtual memory, the operating will receive and process a data access request from the application (block 400). The operating system will access a translation lookaside buffer (TLB) and page table to determine if the virtual address (provided in the data access request) is mapped to a physical address in memory where the data is stored (block 402). A page table is where the operating system stores its mappings of virtual addresses to physical addresses, wherein each mapping is referred to as page table entry (PTE). A MMU (memory management unit) of the processor (e.g., the memory controllers 142 of the processors 140, FIG. 1) stores a cache of recently used mappings from the page table of the operating system. This cache is referred to as the translation lookaside buffer, and is implemented as an associative cache.

If it is determined (after accessing the TLB and or page table) that the requested data resides in local memory, e.g., in the RAM memory module 150, or in the memory 166 of the cacheable memory module 160, etc. (affirmative determination in block 404), the data will be accessed from the physical memory location (corresponding to the virtual memory address) and returned to the requesting application (block 406). More specifically, to translate a virtual address into a physical address, the MMU will initially search the TLB. If a match is found (referred to as a TLB hit), the physical address that is mapped to the virtual address is returned and the memory access operation can continue, wherein the requested data page is accessed from, e.g., the RAM memory module 150 or the memory 166 of the cacheable memory module 160. However, if there is a TLB miss, the MMU handler will access the target page table and look up the address mapping in the page table to determine whether a mapping of the virtual address to a physical address exists (referred to as a page walk). The TLB and page table look-up operations are performed by the translation modules 320 in FIG. 3. If a mapping does exist, the mapping is written back to the TLB (since the hardware accesses memory through the TLB in a virtual memory system), and the faulting instruction is restarted. The subsequent translation will then find a TLB hit, and the memory access operation will continue to access and return the requested data from local memory (block 406).

On the other hand, if it is determined (in block 404) that the requested data does not reside in local memory, a processor exception is generated (block 408). For example, if it is determined that the requested data does not reside in the RAM memory module 150 or in the memory 166 of the cacheable memory module 160, a processor exception is generated in response to such fault, and the process continues in blocks 410 through 420 (as discussed below) to access the data from the memory subsystem 120.

A page table lookup fault may occur for various reasons. For example, the virtual address provided by the application may be invalid such that there is no translation available for the virtual address. This type of fault can occur because of a programming error, and the operating system is configured to process this fault using known techniques. Further, a page table lookup fault will occur if the virtual address is valid, but the requested data page does not actually reside in the local physical memory. This type of page fault will occur if, for example, the requested page has been moved out of physical memory to a secondary store located on the memory subsystem 120 to make room for another page. The secondary store (or backing store) is typically referred to as a "swap partition," a "swap file," or a "page file." When this type of fault occurs (e.g., processor exception generated in block 408), the page will be accessed from the memory subsystem 120 using a process flow as will be described now with reference to blocks 410-420 in FIG. 4.

In particular, when a processor exception is generated (block 408), control data is loaded into the control registers 164 of the cacheable memory module 160 (block 410). The control data is utilized to implement interrupt and/or polling operations (as part of the processor exception handling process) to execute data transfers between the cacheable memory module 160 and the memory subsystem 120. This control data, along with other register data for address translation, is utilized by the control logic 162 (e.g., the translation module 322, FIG. 3) of the cacheable memory module 160 to translate the physical address (corresponding to the requested virtual address) into a local physical address, and generate and transmit a data access request (from the cacheable memory module 160) along with the identified local physical address to the memory subsystem 120 (block 412) over the high-speed serial link 130.

Once the data access request is received by the memory subsystem 120, the control logic circuitry 124 (e.g., the translation module 324) will determine the global physical address, which is mapped to the local physical address received with the data access request, and use the determined global physical address to access the requested data from the physical location of the memory subsystem 120 that corresponds to the local physical address, and return the accessed data page to the cacheable memory module 160 (block 414).

The data that is received by the cacheable memory module 160 is temporality stored in the buffer 168 before it is stored in the local physical memory (e.g., memory 166 of the cacheable memory module 160, or the RAM memory module 150). If there is space in the local memory to store the data page returned from the memory subsystem 120 (affirmative determination in block 416), the associated page table and TLB are updated, and the page is stored in local memory (block 418). After the exception handling (as discussed above) is finished, the previous data access operation is then restarted to access the page form the local memory and return the page to the requesting application (block 420).

On the other hand, if not enough space exists in the local memory to store the data page returned from the memory subsystem 120 (negative determination in block 416), one or more pages in physical memory will be paged-out to the memory subsystem 120 (via any suitable page eviction/replacement policy implemented by the system) to make room for the returned page (block 422). The page table and TLB will be updated to indicate that the paged-out memory page(s) (which previously resided in the local memory) no longer exist in the local memory, and to indicate that the page returned form the memory subsystem 120 is now stored in the local memory (block 418). After the exception handling (as discussed above) is finished, the previous data access operation is then restarted to access the page form the local memory and return the page to the requesting application (block 420).

As discussed above with reference to FIGS. 3 and 4, for example, the memory subsystem 120 can be utilized as a low latency backing store to augment the local physical memory (e.g. RAM memory module 150 and/or memory 166 of the cacheable memory module 160). In one embodiment, the page table systems implemented in the translation modules (FIG. 3) may comprise a frame table and a page table. The frame table holds information about which frames are mapped. In more advanced systems, the frame table can also hold information about which address space a page belongs to, statistics information, or other background information. As noted above, a page table holds a mapping between a virtual address of a page and the address of a physical frame. In another embodiment, auxiliary information about the pages may be maintained in the page tables, wherein such information includes, for example, a present bit, a dirty or modified bit, address space or process ID information, etc.

The data access methods described herein can be utilized to page-in and page-out pages in and out of physical memory and the memory subsystem 120. The present bit can indicate what pages are currently present in physical memory or currently present in the memory subsystem 120. Such bit can further indicate how to treat these different pages, e.g., whether to load a page from the memory subsystem 120 and page out another page in physical memory.

Furthermore, the dirty bit enables performance optimization. In particular, a page on the memory subsystem 120 which is paged-in to local memory, read from local memory, and then subsequently paged-out from local memory, does not need to be written back to the memory subsystem 120 since the page has not been modified (only read). However, if the page was written to after it was paged-in to local memory, the dirty bit of the page will be set, indicating that the page must be written back to the memory subsystem 120. With this process, the memory subsystem 120 retains a copy of the page after it is paged-in to local memory. When a dirty bit is not used, the memory subsystem 120 need only be as large as the instantaneous total size of all paged-out pages at any moment. When a dirty bit is used, some pages will exist in both the local memory and the memory subsystem 120.

In operating systems that are not single address space operating systems, the address space or process ID information is utilized to allow the virtual memory management system to determine what pages to associate to what process. Two processes may use two identical virtual addresses for different purposes. In this circumstance, the page table will supply different virtual memory mappings for the two processes. This can be done by assigning the two processes distinct address map identifiers, or by using process IDs. Associating process IDs with virtual memory pages can also aid in selection of which pages to page-out, since pages associated with inactive processes, particularly processes whose main code page has been paged-out, are less likely to be needed immediately as compared to pages that belong to active processes.

In an alternate embodiment, instead of tagging page table entries with process-unique identifiers, the page table itself may occupy a different virtual-memory page for each process so that the page table becomes a part of the process context. In such an implementation, the page table of the process can be paged-out whenever the process is no longer resident in memory.

It is to be appreciated that there are various advantages to implementing a low-latency memory subsystem to augment physical memory of computing system according to embodiments of the invention as discussed herein. For example, the use of a low-latency memory subsystem to augment physical memory of computing system to support high-performance applications such as in-memory databases enables fast and efficient access to large amounts of physical memory to avoid the latencies associated with accessing data via the traditional storage stack (e.g., HDDs).

Further, embodiments of the invention enable computing systems with heterogeneous resources (e.g., different types of processors) to be readily implemented with dramatic improvement in system performance. In particular, a memory subsystem as described herein allows heterogeneous processors to readily share data at much finer granularity and with much lower latencies, thereby providing a truly efficient heterogeneous computing platform. Moreover, a shared memory subsystem can provide low latency data protection by storing data across multiple fault domains. This benefit is difficult to achieve in current server architectures.

It is to be understood that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system comprising:
   a memory appliance which comprises an array of memory devices and control logic circuitry configured to control access to the array of memory devices; and
   a server node coupled to the memory appliance, wherein the memory appliance is separate from the server node and is configured as a memory subsystem for the server node to augment a system memory of the server node, wherein the server node comprises:
      a processor comprising a memory controller;
      a first memory module comprising the system memory of the server node, which is utilized by the memory controller of the processor to store data associated with an application executing on the server node; and
      a second memory module comprising control logic circuitry that is configured to control access to the memory appliance on behalf of the memory controller of the processor to store data associated with the application executing on the server node;
   wherein the memory controller of the processor communicates with the first memory module and the second memory module using a same first memory interface;
   wherein the second memory module communicates with the control logic circuitry of the memory appliance using a second memory interface, which is different from the first memory interface; and
   wherein the second memory module is configured to (i) receive a data access request from the memory controller of the processor to access data in the array of memory devices of the memory appliance and (ii) utilize the second memory interface to communicate with the control logic circuitry of the memory appliance and execute the data access request to access data in the array of memory devices of the memory appliance on behalf of the memory controller of the processor.

2. The system of claim 1, wherein the second memory interface comprises a high-speed serial interface.

3. The system of claim 1, wherein the first memory module and the second memory module comprise dual in-line memory modules.

4. The system of claim 1, wherein the second memory module comprises a control register to store configuration data that is used by the control logic circuitry to access the memory appliance.

5. The system of claim 4, wherein the configuration data is stored in the control register of the second memory module under control of an operating system of the server node to enable exception handling by the processor.

6. The system of claim 1, wherein the second memory module comprises a control register to store address translation data that is used by the control logic circuitry of the second memory module to translate between a physical address and a local physical address associated with the array of memory devices of the memory appliance.

7. The system of claim 1, wherein the second memory module further comprises random access memory which is utilized by the processor to store data associated with the application executing on the server node.

8. The system of claim 1, wherein the array of memory devices of the memory appliance comprises random access memory devices.

9. The system of claim 1, wherein the array of memory devices of the memory appliance comprises flash memory devices.

10. The system of claim 1, wherein the control logic circuitry of the memory appliance is configured to control access to the array of memory devices of the memory appliance based on data access commands received from the second memory module on the server node.

11. The system of claim 1, wherein the memory appliance is configured as a virtual memory backing store for a virtual memory system of an operating system of the server node.

12. The system of claim 1, wherein the memory appliance is configured as a block storage device, wherein a data block that is cached in the first memory module is stored in a corresponding memory location of the array of memory devices of the memory appliance at the same time using a write-through operation.

13. The system of claim 1, further comprising an out-of-band management network configured to enable communication between the server node and the memory appliance.

14. The system of claim 1, wherein the memory appliance comprises a rack-mounted memory unit that is mounted in an equipment rack, wherein the server node comprises a rack-mounted server node that is mounted in the equipment rack, and wherein the rack-mounted memory unit and the rack-mounted server node are coupled together using at least one of metallic wiring and optical fiber wiring.

15. A method, comprising:
   utilizing, by a memory controller of a processor of a server node, a first memory module comprising a system memory of the server node to store data associated with an application executing on the server node; and
   utilizing, by the memory controller of the processor, a second memory module which comprises control logic circuitry configured to access a memory appliance coupled to the server node, on behalf of the processor, to store data associated with the application executing on the server node;
   wherein the memory appliance comprises an array of memory devices and control logic circuitry configured to control access to the array of memory devices;
   wherein memory appliance is coupled to and separate from the server node, and configured as a memory subsystem for the server node to augment the system memory of the server node;
   wherein the first memory module and the second memory module reside on the server node;
   wherein the memory controller of the processor communicates with the first memory module and the second memory module using a same first memory interface;
   wherein the second memory module communicates with the control logic circuitry of the memory appliance using a second memory interface, which is different from the first memory interface; and
   wherein the second memory module is configured to (i) receive a data access request from the memory controller of the processor to access data in the array of memory devices of the memory appliance and (ii) utilize the second memory interface to communicate with the control logic circuitry of the memory appliance and execute the data access request to access data in the array of memory devices of the memory appliance on behalf of the memory controller of the processor.

16. The method of claim 15, further comprising storing, by the processor, configuration data in a control register of the second memory module, which is utilized by the control logic circuitry of the second memory module to access the memory appliance.

17. The method of claim 15, further comprising:
   storing address translation data in a control register of the second memory module, which is utilized by the control logic circuitry of the second memory module to translate between a physical address and a local physical address associated with the array of memory devices of the memory appliance; and
   storing data associated with the application executing on the server node in a random access memory of the second memory module.

18. The method of claim 15, comprising configuring the memory appliance as a virtual memory backing store for a virtual memory system of an operating system of the server node.

19. The method of claim 15, comprising configuring the memory appliance as a block storage device, wherein a data block that is cached in the first memory module is stored in a corresponding memory location in the array of memory devices of the memory appliance at the same time using a write-through operation.

20. An article of manufacture comprising a non-transitory processor-readable storage medium having stored therein program code of one or more software programs, wherein the program code is executable by a processor to implement a method comprising:
   utilizing, by a memory controller of a processor of a server node, a first memory module comprising a system memory of the server node to store data associated with an application executing on the server node; and
   utilizing, by the memory controller of the processor, a second memory module which comprises control logic circuitry configured to access a memory appliance coupled to the server node, on behalf of the processor, to store data associated with the application executing on the server node;
   wherein the memory appliance comprises an array of memory devices and control logic circuitry configured to control access to the array of memory devices;
   wherein memory appliance is coupled to and separate from the server node, and configured as a memory subsystem for the server node to augment the system memory of the server node;
   wherein the first memory module and the second memory module reside on the server node;
   wherein the memory controller of the processor communicates with the first memory module and the second memory module using a same first memory interface;
   wherein the second memory module communicates with the control logic circuitry of the memory appliance using a second memory interface, which is different from the first memory interface; and
   wherein the second memory module is configured to (i) receive a data access request from the memory controller of the processor to access data in the array of memory devices of the memory appliance and (ii) utilize the second memory interface to communicate with the control logic circuitry of the memory appliance and execute the data access request to access data in the array of memory devices of the memory appliance on behalf of the memory controller of the processor.

* * * * *